UNITED STATES PATENT OFFICE 2,021,851

METHOD OF MAKING ISOPROPYL ESTERS OF ALIPHATIC ACIDS

Gerald H. Coleman, Midland, Mich., assignor to The Dow Chemical Company, Midland, Mich., a corporation of Michigan No Drawing. Application March 9, 1932,
Serial No. 597,803

9 Claims. (Cl. 260—106)

The present invention concerns an improved method of making isopropyl esters of aliphatic acids through reacting such acids with propylene.

It is known that olefines having the general formula:

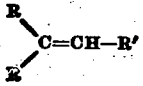

wherein R represents an alkyl group and R' represents hydrogen or an alkyl group, can be reacted with aliphatic acids to form alkyl esters of said acids. The simple olefines having the general formula:

wherein R represents hydrogen or an alkyl group, are less reactive toward aliphatic acids. The higher members of the simple olefines (e. g. n-amylenes, n-hexylenes, etc.) may, however, be reacted with aliphatic acids in the presence of certain catalysts, such as zinc chloride, to form esters of said acids. Ethylene and propylene are least reactive of all olefines toward aliphatic acids.

Isopropyl esters have been formed by first reacting propylene with sulfuric acid at a relatively low temperature to form intermediate addition compounds, such as isopropyl hydrogen sulphate, and then reacting the latter with an aliphatic acid or a salt thereof (e. g. calcium acetate), to form the desired ester. The yields obtained by such method are generally low due to polymerization, charring, etc., of the propylene by the sulfuric acid.

In British Patent 334,228, a method is described whereby propylene is reacted with a solution of acetic and sulphuric acids, the temperature being maintained below 60° C. during reaction. By operating in such manner a mixture of isopropyl alcohol and isopropyl acetate is obtained as a product.

Suida, in U. S. Patent No. 1,836,135, has described a method whereby propylene is reacted with a dilute aqueous aliphatic acid in the presence of a relatively small quantity of sulphuric acid, the reaction mixture being maintained under superatmospheric pressure and at a temperature above 100° C. during reaction. By operating in such manner, polymerization and charring of organic reactants are said to be largely avoided, but a mixture of isopropyl alcohol and isopropyl ester is always formed.

I have now found that propylene may be reacted with a substantially anhydrous aliphatic acid, under superatmospheric pressure, and in the presence of a catalyst, to form the isopropyl ester of the aliphatic acid as substantially the sole reaction product. The reaction may be carried out at any temperature above about 75° C. and below the temperature at which material decomposition of the reaction components occurs. In practice, however, I have found it unnecessary and inconvenient to employ a reaction temperature above about 250° C. I have found, furthermore, that the ester product may be distilled directly from the reacted mixture and thus be separated as the practically pure compound. The present invention, then, consists in an improved method of making isopropyl esters of aliphatic acids, said method being hereinafter fully described and particularly pointed out in the claims.

The following examples describe in detail several of the various ways in which the principle of my invention may be practiced. It is to be understood, however, that said examples are purely illustrative and are not to be construed as a limitation on the invention.

Example 1

Into an iron bomb of the rotating type were placed 120 grams (2.0 mols) of glacial acetic acid, and 10 grams (0.1 mol) of 98 per cent sulphuric acid. Approximately 111 grams (2.64 mols) of propylene were introduced into the bomb and the latter sealed. The bomb was rotated and maintained at the temperature 75° C. during a 6 hour period. The bomb was then cooled to room temperature and the charge removed therefrom. Excess propylene was permitted to escape. The reaction mixture was then fractionally distilled, 89.7 grams (0.88 mol) of substantially pure isopropyl acetate being separated. The yield of isopropyl acetate was 44 per cent of theoretical, based on the quantity of acetic acid employed. No isopropyl alcohol was obtained.

Example 2

Into a bomb similar to that described in Example 1 were placed 120 grams (2 mols) of glacial acetic acid and 10 grams (0.1 mol) of 98 per cent sulphuric acid. About 79.8 grams (1.9 mols) of propylene were introduced to the mixture and the bomb sealed. The bomb was rotated and maintained at the temperature 125° C. during a 6 hour period. The bomb was then cooled and the charge removed therefrom. The reaction mixture was fractionally distilled and 140 grams (1.37 mols) of substantially pure isopropyl acetate separated. The yield was 72 per cent of theoretical, based on the quantity of propylene employed, and 68.5 per cent of theoretical, based on the quantity of acetic acid used. No isopropyl alcohol was obtained.

Example 3

Into an iron bomb were placed 148.1 grams (2.0 mols) of substantially anhydrous propionic acid and 10 grams (0.1 mol) of 98 per cent sulphuric acid. About 126.3 grams (3.05 mols) of propylene were passed into the bomb and the latter sealed. The bomb was agitated and maintained at the temperature 125° C. during a 6 hour period. The bomb was then cooled and the charge removed. The reaction mixture was then fractionally distilled under subatmospheric pressure, 174.5 grams (1.5 mols) of substantially pure isopropyl propionate and 37 grams (0.5 mol) of propionic acid being separated. The yield of isopropyl propionate was 75 per cent of theoretical, based on the quantity of propionic acid employed. Substantially no isopropyl alcohol or other undesirable by-products were obtained.

Example 4

Into an iron bomb were placed 176.1 grams (2 mols) of butyric acid and 10 grams (0.1 mol) of 98 per cent sulphuric acid. About 92.1 grams (2.19 mols) of propylene were passed into the bomb and the latter sealed. The bomb was agitated and maintained at the temperature 125° C. during a 6 hour period. The bomb was then cooled and the reaction mass removed. The reaction mixture was fractionally distilled under subatmospheric pressure, 157.2 grams (1.2 mols) of substantially pure isopropyl butyrate and 70.4 grams (0.8 mol) of unreacted butyric acid being separated. Substantially no isopropyl alcohol or other undesirable by-products were obtained. The yield of isopropyl butyrate was 60 per cent of theoretical, based on the quantity of butyric acid employed.

In each of the examples, approximately 0.1 mol of catalyst was used for every 2 mols of acid employed. Any catalytic quantity of catalyst may, however, be employed successfully. By "catalytic quantity" is meant a quantity of catalyst smaller than that required to be chemically equivalent to the quantity of propylene used. In practice, I prefer to employ less than about 5 mols of catalyst for every 100 mols of propylene used.

In the examples, the reactants were enclosed in a bomb and were reacted under the vapor pressure of the reaction mixture at the reaction temperature. During plant operation, however, the reactants are continuously pumped into a reactor of a type suitable for continuous operation, e. g. a tubular reactor. The pressure may advantageously be sufficient so that all components of the reaction mass are maintained in liquid form during reaction, the mechanical pressure applied, then, being greater than the vapor pressure of the mixture. The reacted mixture is withdrawn continuously from the reactor, fractionally distilled to separate the pure ester product and the unreacted propylene and aliphatic acid and the catalyst are replenished with fresh quantities of propylene and the desired aliphatic acid and are returned to the reactor. After operating in such cyclic manner through several cycles, an equilibrium is reached, so that thereafter the quantities of propylene and aliphatic acid added in a given cycle are converted directly into the desired ester product in the same cycle.

Although we prefer to employ propylene and the desired aliphatic acid in approximately equimolecular quantities, a large excess of either reactant may be used without deleterious effect.

In the examples substantially pure propylene was employed as a reactant. Impure propylene, e. g. propylene containing an appreciable quantity of impurities such as saturated hydrocarbons, ethylene, etc., may, however, be employed successfully as a reactant for the preparation of isopropyl esters according to the present method. If the propylene contains an appreciable quantity of the more reactive higher olefines, such as butylenes, amylenes, etc., a mixture of esters will, of course, be formed. Ethylene, on the contrary, may be present in considerable quantity without reacting to form undesirable by-products, and, in fact, the present method affords a convenient means for separating ethylene from other olefines.

In each of the examples, the ester product was separated from the reacted mixture through fractional distillation of the latter. If an appreciable quantity of sulphuric acid has been employed as a catalyst, it may sometimes be advantageous to neutralize or remove a portion of the sulphuric acid so as to avoid charring of the organic components of the mixture during distillation. I prefer to add lime to the reacted mixture when such neutralization is desired, though any of many other basic materials, such as sodium hydroxide, sodium carbonate, etc., may be employed instead. Ordinarily, such neutralization of excess sulphuric acid is unnecessary, as charring may be avoided, for instance, by carrying the last stages of the fractional distillation out under subatmospheric pressure.

Instead of separating the ester product from the reaction mixture through direct distillation of the latter, the cooled reaction mixture may, of course, be neutralized with a basic material, washed with water, dried, and finally purified through distillation. As previously stated, such intermediate steps ordinarily are unnecessary in practicing my invention.

The exact pressure under which a reaction between propylene and an aliphatic acid is carried out is dependent, of course, upon a number of factors, among which may be mentioned, quantity of reactants used, relative size of reactor employed, reaction temperature maintained, etc. In general, however, I have found that the reaction will proceed smoothly when carried out at, or above, the vapor pressure of the reaction mixture at a reaction temperature between about 75° C. and about 250° C.

The present invention, in brief, comprises reacting propylene with a substantially anhydrous aliphatic acid in the presence of a catalyst, at a temperature preferably between about 75° and about 250° C., and under superatmospheric pressure to form an isopropyl ester of said aliphatic acid as substantially the sole reaction product, separating the isopropyl ester from the reacted mixture, and returning all other components of the mixture to the reaction.

Other modes of applying the principle of my invention may be employed instead of those explained, change being made as regards the method herein disclosed, provided the step or steps stated by any of the following claims or the equivalent of such stated step or steps be employed.

I therefore particularly point out and distinctly claim as my invention:—

1. In a method of making an isopropyl ester of an aliphatic acid, the step which consists in reacting propylene with a substantially anhydrous saturated aliphatic monocarboxylic acid under superatmospheric pressure, in the presence of sulphuric acid as catalyst.

2. In a method of making an isopropyl ester of an aliphatic acid, the step which consists in reacting propylene with a substantially anhydrous saturated aliphatic monocarboxylic acid in the presence of sulphuric acid as catalyst, the reaction mixture being maintained under superatmospheric pressure and at a temperature between about 75° and about 250° C. during reaction.

3. In a method of making an isopropyl ester of an aliphatic acid, the steps which consist in reacting propylene with a substantially anhydrous saturated aliphatic monocarboxylic acid in the presence of sulphuric acid as a catalyst, the reaction mixture being maintained under superatmospheric pressure and at a temperature between about 75° and about 250° C. during reaction, substantially neutralizing the free sulphuric acid in the reaction mixture, distilling the latter to separate the ester product therefrom, and returning unreacted propylene and aliphatic acid to the first step.

4. In a method of making isopropyl acetate, the step which consists in reacting propylene with glacial acetic acid in the presence of sulphuric acid as catalyst, the reaction mixture being maintained under superatmospheric pressure and at a temperature between about 75° and about 250° C. during reaction.

5. In a method of making isopropyl acetate, the steps which consist in reacting propylene with glacial acetic acid in the presence of sulphuric acid as catalyst, the reaction mixture being maintained under superatmospheric pressure and at about the temperature 125° C. during reaction, fractionally distilling the reacted mixture to separate isopropyl acetate therefrom, and returning unreacted components of the mixture to the first step.

6. In a method of making isopropyl propionate, the step which consists in reacting propylene with substantially anhydrous propionic acid in the presence of sulphuric acid as catalyst, the reaction mixture being maintained under superatmospheric pressure and at a temperature between about 75° and about 250° C. during reaction.

7. In a method of making isopropyl propionate, the steps which consist in reacting propylene with substantially anhydrous propionic acid in the presence of sulphuric acid as catalyst, the reaction mixture being maintained under superatmospheric pressure and at about the temperature 125° C. during reaction, fractionally distilling the reacted mixture to separate isopropyl propionate therefrom, and returning unreacted components of the mixture to the first step.

8. In a method of making isopropyl butyrate, the step which consists in reacting propylene with substantially anhydrous butyric acid in the presence of sulphuric acid as catalyst, the reaction mixture being maintained under superatmospheric pressure and a temperature between about 75° and about 250° C. during reaction.

9. In a method of making isopropyl butyrate, the steps which consist in reacting propylene with substantially anhydrous butyric acid in the presence of sulphuric acid as catalyst, the reaction mixture being maintained under superatmospheric pressure and at about the temperature 125° C. during reaction, fractionally distilling the reacted mixture to separate isopropyl butyrate therefrom, and returning unreacted components of the mixture to the first step.

GERALD H. COLEMAN.